June 9, 1931. F. W. ISLES 1,809,167
METHOD OF CONDENSING GASOLINE VAPORS
Filed Jan. 25, 1927
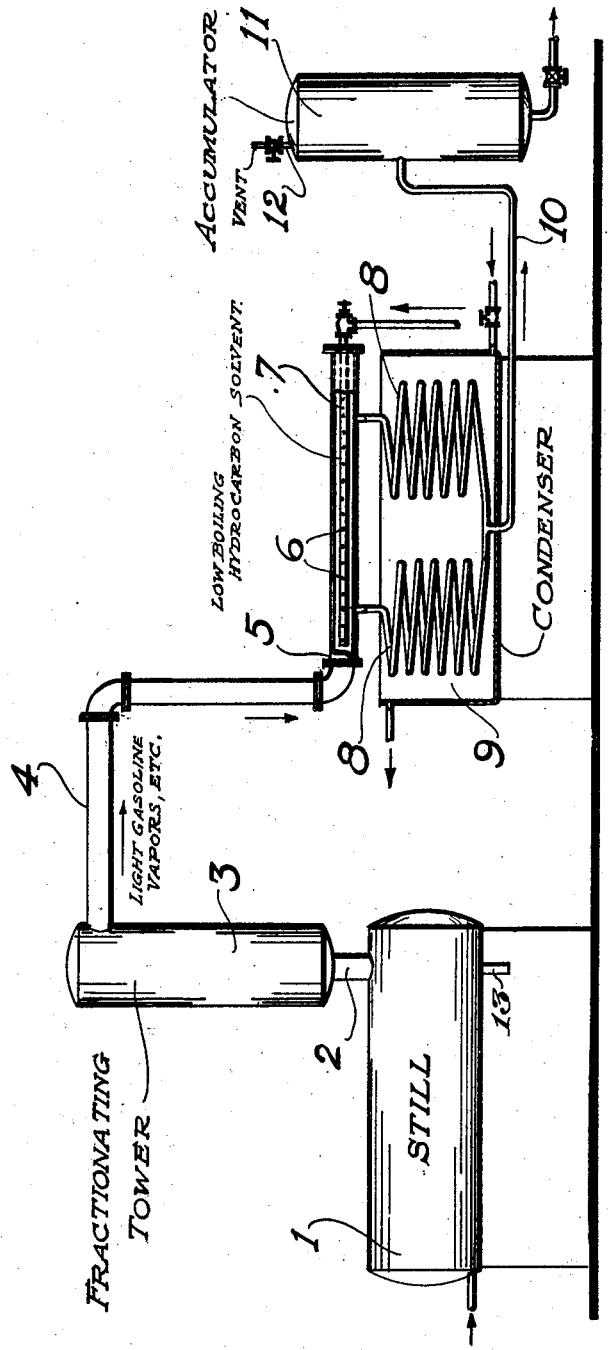
Inventor
FREDERICK W. ISLES.
By his Attorney Patented June 9, 1931

1,809,167

UNITED STATES PATENT OFFICE

FREDERICK W. ISLES, OF BAYONNE, NEW JERSEY, ASSIGNOR TO STANDARD OIL DEVELOPMENT COMPANY, A CORPORATION OF DELAWARE

METHOD OF CONDENSING GASOLINE VAPORS

Application filed January 25, 1927. Serial No. 163,329.

This invention relates to improvements in the recovery of low-boiling petroleum oils from gases and/or vapors containing the same. The invention is based on the addition of benzol or equivalent material to a gas or vapor stream containing such low-boiling oils.

The invention will be fully understood from the following description, read in connection with the accompanying drawing, in which the single figure is a diagrammatic side elevation of a stripping still and condensing equipment.

Referring to the drawing, reference numeral 1 denotes a stripping still having a vapor line 2 leading to a tower 3, which may have bell caps or other baffle means. The still 1 is charged with an oil containing absorbed low-boiling petroleum constituents. This oil may be the absorption stock obtained from a refinery gasoline recovery plant. The low-boiling constituents (gases, light gasoline, etc.) are expelled by heating the absorption stock in still 1 and pass through the fractionating tower 3 and a vapor line 4 in the usual manner. The oil from which the absorbed constituents have been removed may be continuously or periodically withdrawn by means of the outlet pipe 13.

The distilled vapors pass from vapor line 4 into a header 5 and are showered with a low-boiling hydrocarbon solvent, especially benzol, issuing from perforations 6 in a pipe 7 arranged longitudinally in the header.

The benzol and still vapors pass together through cooling coils 8, wherein vapors are condensed. These coils may be immersed in a tank 9 supplied with cooling water, or they may be otherwise suitably cooled. The product is drawn off through line 10 to an accumulator 11 which has a vent line 12, for incondensible gases.

The yield of gasoline constituents is usually increased by 30% or more, as compared with that obtained by simple condensation, when the solvent or absorbent oil is used as described. The benzol blends produced are well adapted for mixing with heavy naphtha to produce motor gasoline of high quality.

The amount of benzol required will vary with the composition of the vapors from the still. Enough benzol should be supplied to absorb, dissolve, or otherwise fix substantially all the gasoline vapors. It is best introduced in liquid form. Any benzol vaporized in the header will, of course, be condensed in contact with petroleum vapors as it passes with them through the cooling coils 8.

Instead of benzol, I may use an equivalent, for example, a naphtha fraction having an average boiling temperature not materially different from that of benzol (176° F.). The initial and final boiling points of the naphtha fraction may be respectively about 169° F. and 338° F. I have found that such relatively low-boiling liquids are highly efficient absorbents for gasoline vapors and give much better results than kerosene or heavier oils.

The method described is not limited to the recovery of vapors from absorption stock. It may be used also with advantage in charcoal absorption plants for the recovery of gasoline from natural gas. In this case the benzol or the like will be brought into contact with the vapors expelled from the saturated charcoal. Similarly, gasoline yields are increased by practicing the method in connection with condensers for the re-compressed residue gases obtained at natural gas recovery plants, in the compressed gasoline recovery plants, in the compressed gas coolers of compression gasoline plants, and the like.

Various modifications of the preferred method described may be made within the scope of the appended claims, in which it is my intention to claim all novelty inherent in the invention as broadly as the prior art permits.

I claim:

1. In a method of recovering low-boiling volatilized petroleum oils, of the type of light gasoline, the improvement that comprises bringing such oils into intimate contact with a solvent therefor having an average boiling temperature not materially different from that of benzol, cooling, and collecting condensed low-boiling petroleum oils and solvent.

2. In a method of recovering low-boiling volatilized petroleum oils, of the type of light gasoline, the improvement that comprises supplying streams of benzol to mingle with such volatilized oils, condensing the oils in contact with the benzol, and recovering the condensed product.

3. Method of recovering light gasoline vapors, comprising distilling such vapors from a solvent oil containing the same, bringing benzol into intimate contact with the stream of distilled vapors, passing the benzol and vapors together through a condensing zone, and collecting the condensate.

4. Method of condensing light petroleum vapors mixed with incondensible gas, said method comprising cooling said vapors to a condensing temperature in the presence of benzol, whereby a benzol-petroleum blend is formed and the said vapors are substantially completely removed from the incondensible gas, collecting the blend, and withdrawing gas.

In testimony that I claim the foregoing as my invention, I affix my signature.

FREDERICK W. ISLES.